US012396489B2

(12) United States Patent
Greim et al.

(10) Patent No.: US 12,396,489 B2
(45) **Date of Patent: *Aug. 26, 2025**

(54) METHOD OR FORMING ELONGATED ARRAY WITH HEATING ELEMENTS THAT BOW CONCENTRICALLY OUTWARD FROM RADIAL CENTERLINE

(71) Applicant: Philip Morris USA Inc., Richmond, VA (US)

(72) Inventors: Olivier Greim, Villars-Burquin (CH); Felix Fernando, Berkshire (GB); Charles Higgins, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 79 days.

This patent is subject to a terminal disclaimer.

(21) Appl. No.: 18/503,485

(22) Filed: Nov. 7, 2023

(65) Prior Publication Data

US 2024/0065343 A1 Feb. 29, 2024

Related U.S. Application Data

(60) Division of application No. 17/901,199, filed on Sep. 1, 2022, now Pat. No. 11,832,655, which is a division (Continued)

(30) Foreign Application Priority Data

Dec. 30, 2009 (EP) .................................... 09252924

(51) Int. Cl.

*F24H 1/00* (2022.01)
*A24F 40/70* (2020.01)

(Continued)

(52) U.S. Cl.

CPC ........... *A24F 40/70* (2020.01); *F24H 1/0018* (2013.01); *H05B 3/0019* (2013.01); *H05B 3/46* (2013.01);

(Continued)

(58) Field of Classification Search

None

See application file for complete search history.

(56) References Cited

U.S. PATENT DOCUMENTS 2,358,406 A * 9/1944 Lichtgarn ........... G01N 27/121 252/514
4,365,139 A 12/1982 Dannatt (Continued)

FOREIGN PATENT DOCUMENTS

CN 1708241 A 12/2005
CN 101277623 A 10/2008

(Continued)

OTHER PUBLICATIONS

Australian Office Action mailed Nov. 16, 2015 issued in Australian Application No. 2010-338615.

(Continued)

*Primary Examiner* — Thor S Campbell
(74) *Attorney, Agent, or Firm* — Harness, Dickey & Pierce, P.L.C.

(57) ABSTRACT

The method includes forming an elongated array by first connecting first distal ends of first heating elements to each other to form a first end of the elongated array, and second connecting second distal ends of the first heating elements to each other to form a second end of the elongated array, a midsection of the first heating elements of the elongated array bowing concentrically outward from a radial centerline running longitudinally through the first end and the second end.

20 Claims, 5 Drawing Sheets

Related U.S. Application Data of application No. 16/404,055, filed on May 6, 2019, now Pat. No. 11,432,592, which is a division of application No. 15/256,985, filed on Sep. 6, 2016, now Pat. No. 10,306,707, which is a continuation of application No. 14/033,154, filed on Sep. 20, 2013, now Pat. No. 9,459,021, which is a continuation of application No. 12/975,912, filed on Dec. 22, 2010, now Pat. No. 8,558,147.

(51) Int. Cl.

| | |
|---|---|
| ***H05B 3/00*** | (2006.01) |
| ***H05B 3/46*** | (2006.01) |
| *A24F 40/20* | (2020.01) |
| *A24F 40/46* | (2020.01) |

(52) U.S. Cl.

CPC ............... *A24F 40/20* (2020.01); *A24F 40/46* (2020.01); *H05B 2203/017* (2013.01)

(56) References Cited

U.S. PATENT DOCUMENTS

| | | | | | |
|---|---|---|---|---|---|
| 5,060,671 | A * | 10/1991 | Counts | A24F 40/50 | 131/273 |
| 5,228,460 | A * | 7/1993 | Sprinkel | A24F 40/46 | 131/194 |
| 5,322,075 | A * | 6/1994 | Deevi | A24F 40/46 | 131/194 |
| 5,353,813 | A * | 10/1994 | Deevi | A24F 40/46 | 131/194 |
| 5,388,594 | A * | 2/1995 | Counts | A24F 40/485 | 131/194 |
| 5,498,855 | A * | 3/1996 | Deevi | A24F 40/46 | 131/194 |
| 5,499,636 | A * | 3/1996 | Baggett, Jr. | A24C 5/01 | 131/194 |
| 5,591,368 | A * | 1/1997 | Fleischhauer | A24F 40/46 | 131/194 |
| 5,665,262 | A * | 9/1997 | Hajaligol | A24F 40/46 | 131/194 |
| 5,692,291 | A * | 12/1997 | Deevi | A24D 1/20 | 338/319 |
| 5,880,439 | A | 3/1999 | Deevi et al. | | |
| 6,489,597 | B1 | 12/2002 | Hornung | | |
| 6,688,313 | B2 * | 2/2004 | Wrenn | A24C 5/606 | 131/194 |
| 6,803,545 | B2 * | 10/2004 | Blake | H05B 3/58 | 131/194 |
| 6,994,096 | B2 | 2/2006 | Rostami et al. | | |
| 7,234,470 | B2 * | 6/2007 | Yang | A24F 40/46 | 131/194 |
| 8,511,318 | B2 | 8/2013 | Hon | | |
| 8,558,147 | B2 | 10/2013 | Greim et al. | | |
| 9,055,617 | B2 * | 6/2015 | Thorens | A24F 40/46 | |
| 9,459,021 | B2 * | 10/2016 | Greim | H05B 3/0019 | |
| 11,832,655 | B2 * | 12/2023 | Greim | H05B 3/0019 | |
| 2004/0149296 | A1 | 8/2004 | Rostami et al. | | |
| 2012/0090630 | A1 | 4/2012 | Hon | | |
| 2014/0064715 | A1 * | 3/2014 | Greim | H05B 3/0019 | 392/394 |
| 2015/0359264 | A1 * | 12/2015 | Fernando | H01J 49/0036 | 250/281 |

FOREIGN PATENT DOCUMENTS

| | | | |
|---|---|---|---|
| CN | 201479920 | U | 5/2010 |
| EP | 0358002 | A2 | 3/1990 |
| EP | 0358020 | A2 | 3/1990 |
| EP | 0488488 | A1 | 6/1992 |
| EP | 0503767 | A1 | 9/1992 |
| JP | H08-511176 | A | 11/1996 |
| KR | 10-1998-0705691 | A | 11/1999 |
| KR | 100636287 | B1 | 10/2006 |
| WO | WO-95/27412 | A1 | 10/1995 |
| WO | WO-9823171 | A1 | 6/1998 |
| WO | WO-2009/079641 | A2 | 6/2009 |

OTHER PUBLICATIONS

Canadian First Office Action dated Nov. 16, 2016 in Canadian Application No. 2,785,890.

Canadian Second Office Action dated Aug. 25, 2017 in Canadian Application No. 2,785,890.

Chinese Office Action and Search Report dated Apr. 1, 2014.issued in Chinese Application No. 201080063409.8 (with English Translation).

Columbia Office Action dated Jul. 25, 2013 issued in Columbian Application No. 12115805 (with English Translation).

Eurasian First Office Action dated May 27, 2014 issued in Eurasian Application No. 201290581 (with English Translation).

Eurasian Second Office Action dated Sep. 24, 2014, issued in Eurasian Application No. 201290581.

European Search Report dated Jun. 2, 2010 issued in European Application No. 09252924.7-2313.

Israeli Office Action dated Mar. 22, 2015 issued in Israeli Application No. 220558 (with English Translation).

Japanese Office Action dated Oct. 31, 2014 issued in Japanese Application No. 2012-546384 (with English Translation).

Korean Office Action dated May 15, 2017 issued in Korean Application No. 10-2012-7018990 (with English Translation).

Mexican Office Action dated Jun. 26, 2014 issued in MX/a/2012-007757 (with English Translation).

New Zealand Office Action dated Mar. 22, 2013 issued in New Zealand Application No. 600869.

International Search Report and Written Opinion dated Apr. 8, 2011 issued in International Application No. PCT/EP2010/007876.

Philippines First Office Action mailed Jan. 22, 2014 issued in Philippine Application No. 1-2012-501298.

Philippines Second Office Action mailed Jun. 24, 2014 issued in Philippine Application No. 1-2012-501298.

Philippines Third Office Action mailed Sep. 5, 2014 issued in Philippine Application No. 1-2012-501298.

Philippines Fourth Office Action mailed Jan. 29, 2015 issued in Philippine Application No. 1-2012-501298.

Philippines Fifth Office Action mailed Apr. 24, 2015 issued in Philippine Application No. 1-2012-501298.

Ukrainian Decision to Grant mailed Feb. 24, 2014 issued in Ukrainian Application No. 2012-09173 (with English Translation).

Vietnamese Office Action dated Aug. 27, 2015 issued in Vietnamese Application No. 1-2012-02157 (with English Translation).

Korean Notice of Allowance dated Jan. 3, 2018 in Korean Application No. 10-2012-7018990 (with English Translation).

Search Report dated Jun. 2, 2010 for European Patent Application No. 09252924.7-2313.

* cited by examiner

METHOD OR FORMING ELONGATED ARRAY WITH HEATING ELEMENTS THAT BOW CONCENTRICALLY OUTWARD FROM RADIAL CENTERLINE

CROSS REFERENCE TO RELATED APPLICATION

This application is a divisional of U.S. application Ser. No. 17/901,199, filed Sep. 1, 2022, which is a divisional of U.S. application Ser. No. 16/404,055, filed May 6, 2019, which is a divisional of U.S. application Ser. No. 15/256,985, filed Sep. 6, 2016, which is a continuation of U.S. application Ser. No. 14/033,154, filed Sep. 20, 2013, which is a continuation of U.S. application Ser. No. 12/975,912, filed Dec. 22, 2010, which corresponds to and claims priority under 35 U.S.C. § 119 to European Application No. 09252924.7, filed Dec. 30, 2009, the entire content of each of which is hereby incorporated by reference.

WORKING ENVIRONMENT

EP-A-0 358 020 discloses a smoking article including a cigarette with a resistance heating element for heating tobacco material in the cigarette. The cigarette has an electrical connection plug for connection to a reusable, hand held controller. The hand held controller includes a battery and a current control circuit which controls the supply of power to the resistance heating element in the cigarette.

One disadvantage with such a proposed smoking article is that the heating element is not in direct contact with the tobacco material, and so the resistance heating element only indirectly heats the tobacco material via air which is drawn over the heater and in turn over the tobacco material. This can lead to inefficient heating of the tobacco material because of the indirect heating process. This may also mean that the article can get hotter than is desirable because of the indirect heating process.

SUMMARY OF SELECT FEATURES OF THE PREFERRED EMBODIMENT

In a preferred embodiment, a heater for heating an aerosol-forming substrate includes a plurality of elongate heating elements arranged in an elongate array having a support end with a first dimension, a heating end with a second dimension and a middle portion with a third dimension. Preferably, the array is arranged to heat the substrate to form an aerosol. Also preferably, the third dimension is greater than the first dimension and greater than the second dimension.

In the preferred embodiment the plurality of elongate heating elements is arranged in a substantially tubular array. Preferably, at least one of the first dimension, the second dimension and the third dimension is a diameter of the array. Also preferably, the plurality of heating elements are electrically connected or mechanically connected or both mechanically and electrically connected to each other at the heating end. Moreover, the dimension of the middle portion of the array is larger than an inside dimension of a cavity of the aerosol-forming substrate, such that, when the plurality of heating elements are inserted into the cavity of the aerosol-forming substrate, the heating elements are pressed towards each other so as to exert a force on the substrate.

Also in the preferred embodiment, the heater also includes at least one external heating element for heating the outside of the aerosol-forming substrate. Preferably, the heater can also include an electrically conductive pin located substantially in the center of the elongate array of heating elements. The plurality of heating elements is connectable between a first voltage and a second voltage. Moreover, All the heating elements are connectable to one of the first and second voltages at the support end and all the heating elements are connectable to the other of the first and second voltages at the heating end. Preferably, the support end of at least one of the heating elements is connectable to one of the first and second voltages and the support end of at least one other of the heating elements is connectable to the other of the first and second voltages.

Also preferably, the heater includes a switch for each heating element, each switch allowing electrical current to flow through the respective heating element. In the preferred embodiment, the heater includes a switch, the switch allowing electrical current to flow through all the heating elements.

In another embodiment, an electrically heated aerosol generating system for receiving an aerosol-forming substrate includes a heater for heating the aerosol-forming substrate. Preferably, the heater includes a plurality of elongate heating elements arranged in an elongate array having a support end with a first dimension, a heating end with a second dimension and a middle portion with a third dimension, the array arranged to heat the substrate to form an aerosol. In the preferred embodiment, the third dimension is greater than the first dimension and greater than the second dimension.

BRIEF DESCRIPTION OF THE DRAWINGS

The invention will be further described, by way of example only, with reference to the accompanying drawings wherein like reference numerals are applied to like elements and wherein.

DETAILED DESCRIPTION

Figure 1:
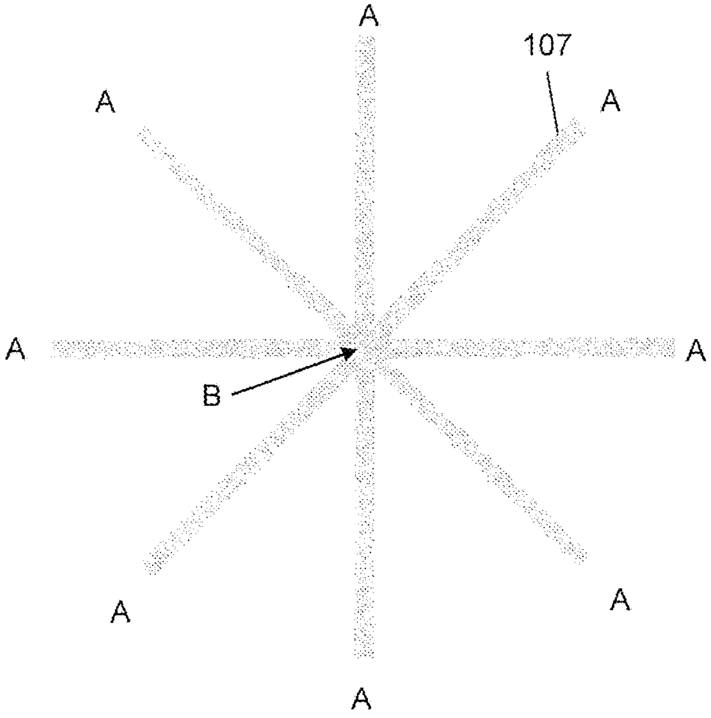
FIG. 1 shows a plurality of heating elements of a first embodiment of a heater, during construction.

The present invention relates to a heater for heating an aerosol-forming substrate. Preferably but not exclusively, the present invention relates to an electrical heater for heating an aerosol-forming substrate and to a heater for an electrically heated aerosol-generating system. The invention finds particular application as an internal heater for an electrically heated smoking system for heating an aerosol-forming substrate having a cavity.

In a preferred embodiment, a heater for heating an aerosol-forming substrate includes a plurality of elongate heating elements arranged in an elongate array having a support end with a first dimension, a heating end with a second dimension and a middle portion with a third dimension. Preferably, the array is arranged to heat the substrate to form an aerosol. Also preferably, the third dimension is greater than the first dimension and greater than the second dimension.

A heater as described herein has the advantage that the heating elements can provide efficient heating of the substrate due to the contact with the substrate. The heating end may be inserted into a cavity of the aerosol-forming substrate while the support end opposite the heating end may remain outside (or near the outside) of the aerosol-forming substrate. The middle portion is between the support end and the heating end and may contact the aerosol-forming substrate. Because the middle portion of the array has the greatest dimension (which may be its diameter if the array has a generally circular or near-circular cross section), the elongate array can be easily inserted into the cavity of the aerosol-forming substrate at the heating end, while still providing good contact with the inside of the substrate. The heater is advantageous because the good contact with the substrate provides optimal heating of the substrate. Since the heating process is efficient, the temperature and power needed may be reduced.

In addition, the heater has the advantage that any condensate that forms on the outside of the heating elements will be removed by contact with the inside of the substrate. The heater may additionally have the advantage that the temperature of the heating elements is high enough to allow for any condensate that is not removed by contact with the substrate to evaporate during the heating process. The elongate array also provides a robust arrangement for the heater, which reduces the likelihood that the heating elements will break.

In the preferred embodiment, the heater may be used in an electrically heated aerosol-generating system. Preferably, the heater is an internal heater. However, the heater may also be an external heater.

Preferably, the plurality of elongate heating elements is arranged in a substantially tubular array. That is to say, the array may be substantially tubular in shape. At least one of the first dimension, the second dimension and the third dimension may be a diameter of the array. Preferably the first dimension is the diameter of the tubular array at the support end. Also preferably the second dimension is the diameter of the tubular array at the heating end. Moreover, the third dimension is the diameter of the array in the middle portion. The diameter of the array may be measured through and substantially perpendicular to the longitudinal axis of symmetry of the array. Alternatively, the heating elements are arranged in a substantially conical array. That is to say, the array may be substantially conical in shape.

Preferably, the second dimension at the heating end is smaller than the first dimension at the support end. In the preferred arrangement, the heating end is in the form of a point. This facilitates easy insertion of the heating elements into a cavity of the aerosol-forming substrate. Preferably, the heating elements are curved between the support end, the middle portion and the heating end. In the preferred embodiment, the heating elements are curved towards one another to form a point at the heating end. In that case, the elongate array is preferably nose-cone shaped, and each heating element preferably has a curved, elliptical shape.

Preferably, the substantially elongate array has a generally circular cross section. However, this need not be the case and a generally rectangular, generally oval or other shaped cross section is also possible. In that case, the dimension of each of the support end, heating end and middle portion may include a measurement substantially perpendicular to the longitudinal axis of the array. The measurement may include the span of the array, the breadth of the array or the width of the array. Preferably, the dimension of each of the support end, heating end and middle portion includes the largest measurement substantially perpendicular to the longitudinal axis of the array which would be the limiting measurement if inserting the elongate array into an aerosol-forming substrate.

Preferably, the elongate array of heating elements extends from a collar at the support end. The collar may be substantially circular in cross section. However, the collar may also take a variety of other forms, for example, square, rectangular, oval or octagonal. In one embodiment, the collar includes a ring. In another embodiment, the collar includes an annular disc. The collar may be electrically conductive. Alternatively, the collar may be electrically insulating.

Preferably, the plurality of heating elements are electrically connected to each other at the heating end. Also preferably, the plurality of heating elements are mechanically connected to each other at the heating end. The plurality of heating elements may be both electrically and mechanically connected to each other at the heating end.

In the preferred embodiment, the dimension of the middle portion of the array is larger than an inside dimension of a cavity of the aerosol-forming substrate, such that, when the plurality of heating elements are inserted into the cavity of the aerosol-forming substrate, the heating elements are pressed towards each other so as to exert a force on the substrate. The dimension of the middle portion is preferably the diameter of the middle portion. The inside dimension of the cavity is preferably the inside diameter of the cavity.

When the heating elements are pressed towards each other, they are preferably pressed towards the central axis of symmetry of the heater, that is to say, towards the longitudinal axis of symmetry of the elongate array. Preferably, the force exerted on the substrate is exerted in a direction away from the central axis of symmetry of the heater, that is to say, away from the longitudinal axis of symmetry of the elongate array. This arrangement further optimises the contact with the substrate, which increases efficiency of the heating process.

The plurality of heating elements may include two heating elements. If the elongate array includes two heating elements, each heating element may be positioned away from its adjacent heating element by an angle of about 180°, when viewed along the longitudinal axis of the heater. That is to say, the two heating elements may be substantially opposite one another. In that case, the dimension of each of the support end, the heating end and the middle portion may include the distance between the two heating elements measured substantially perpendicular to the longitudinal axis. Alternatively, the plurality of heating elements may include three heating elements. If the elongate array includes three heating elements, each heating element may be positioned away from its adjacent heating element by an angle of about 120°, when viewed along the longitudinal axis of the heater. In that case, the dimension of each of the support end, the heating end and the middle portion may include the distance between two of the three heating elements or another dimension measured substantially perpendicular to the longitudinal axis.

Alternatively, the plurality of heating elements may include four heating elements. If the elongate array includes four heating elements, each heating element may be positioned away from its adjacent heating element by an angle of about 90°, when viewed along the longitudinal axis of the heater. In that case, the dimension of each of the support end, the heating end and the middle portion may include the distance between two of the heating elements measured substantially perpendicular to the longitudinal axis, preferably two of the heating elements which are opposite one another.

The plurality of heating elements may include five, six, seven or eight heating elements. If the elongate array includes eight heating elements, each heating element may be positioned away from its adjacent heating element by an angle of about 45° when viewed along the longitudinal axis of the heater. For any number of heating elements, the dimension of each of the support end, the heating end and the middle portion may include the distance between the two substantially opposite heating elements, measured substantially perpendicular to the longitudinal axis of the array.

Each of the plurality of elongate heating elements preferably includes an electrically resistive material. Suitable electrically resistive materials include but are not limited to: semiconductors such as doped ceramics, electrically conductive ceramics (such as, for example, molybdenum disilicide), carbon, graphite, metals, metal alloys and composite materials made of a ceramic material and a metallic material. Such composite materials may include doped or undoped ceramics. Examples of suitable doped ceramics include doped silicon carbides. Examples of suitable metals include titanium, zirconium, tantalum and metals from the platinum group. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal® and iron-manganese-aluminium based alloys (Timetal® is a registered trade mark of Titanium Metals Corporation, 1999 Broadway Suite 4300, Denver Colorado). In composite materials, the electrically resistive material may optionally be embedded in, encapsulated or coated with an insulating material or vice-versa, depending on the kinetics of energy transfer and the external physicochemical properties required.

Alternatively, each of the plurality of elongate heating elements may include an infra-red heating element, a photonic source, or an inductive heating element.

Preferably, each of the plurality of elongate heating elements takes the form of an elongate blade.

In the preferred embodiment, the plurality of heating elements is formed by flat stamping the heating elements from a single sheet of suitable material. The collar may also be formed by flat stamping from a sheet of suitable material. The collar may be substantially circular in shape.

In an alternative embodiment, the stamped heating elements may form a spider or star shape. In that case, the heating elements are then bent towards the collar to form the substantially elongate array. In yet another embodiment, the stamped heating elements may form a comb shape. In that case, the linking element joining the teeth of the comb is then curved into a ring to form the substantially elongate array of heating elements. In still another embodiment, the collar and the plurality of heating elements are formed separately and the heating elements are then connected to the linking element, for example, by welding. The support end of the heating elements may be held in place by the collar by welding, gluing or otherwise attaching them to the collar.

The heater may further include at least one external heating element for heating the outside of the aerosol-forming substrate. The external heating element or elements may include heating blades designed to surround the substrate. The external heating element or elements may include a tube designed to surround the substrate. The external heating element or elements may include a disk (end) heater. If a collar is provided at the support end, it is possible for the collar to include the external heating element. Suitable materials for the external heating element or elements are the same as those set out above for the heating elements.

In the preferred embodiment, the heater further includes an electrically conductive pin located substantially in the center of the elongate array of heating elements. The pin may connect all the heating elements to a first voltage. Each heating element may also be connectable to a second voltage, via a switch, such that when the switch is on, the respective heating element is energized. Alternatively, all the heating elements may be connectable to a second voltage, via a single switch, such that when the switch is on, all the heating elements are energized. In those embodiments, preferably a collar at the support end is electrically conductive and is connected to the second voltage and to the support end of the heating elements.

Preferably, the electrically conductive pin is electrically connected to all the heating elements at the heating end, the pin preferably connecting all the heating elements to a first voltage. In that embodiment, the pin is preferably connected to a first voltage and is connected to all the heating elements at the heating end. The collar is preferably connected to a second voltage and is connectable to all the heating elements at the support end.

Preferably the plurality of heating elements is connectable between a first voltage and a second voltage. In that embodiment, the support end of at least one of the heating elements may be connectable to one of the first and second voltages.

In the preferred embodiment, all the heating elements are connectable to one of the first and second voltages at the support end and all the heating elements are connectable to the other of the first and second voltages at the heating end. That is to say, when connected, current flows between the first voltage at the support end, through each heating element, to the second voltage at the heating end.

In an alternative embodiment, the support end of at least one of the heating elements is connectable to one of the first and second voltages and the support end of at least one other of the heating elements is connectable to the other of the first and second voltages. That is to say, when connected, current flows between the first voltage at the support end of some of the heating elements, through those heating elements to the heating end, through the other heating elements from the heating end to the second voltage at the support end.

Preferably, the heater may include a switch for each heating element, each switch allowing electrical current to flow through the respective heating element. In that case, each heating element is under individual control. In that case, each heating element can be individually energized. Control of the switches will dictate which of the heating elements is energized. This is advantageous as it may allow different portions of the aerosol-forming substrate to be selectively heated.

Alternatively, the heater may include a switch, the switch allowing electrical current to flow through all the heating elements. In that case, preferably, the switch for all the heating elements is under one common control. In that case, the switch is either on or off, such that either all the heating elements are energized or none of the heating elements are energized. The switch may alternatively allow electrical current to flow through some but not all the heating elements.

In the preferred embodiment, the heater includes an electrically conductive pin which is electrically connected to a first voltage and is electrically connected to all of the heating elements at the heating end. At the support end, the heating elements are connectable to a second voltage, via a single switch.

In another preferred embodiment, the heater includes an electrically conductive pin which is electrically connected to a first voltage and is electrically connected to all of the heating elements at the heating end. At the support end, the heating elements are each connectable to a second voltage, via a respective switch.

In still another preferred embodiment, some of the heating elements are connected to a first voltage at the support end. This may be via a single switch or via an individual switch for each heating element. Other of the heating elements are connected to a second voltage at the support end. Again, this may be via a single switch or via an individual switch for each heating element. The heating elements are connected to each other at the heating end.

An electrically heated aerosol generating system for receiving an aerosol-forming substrate including the heater as described herein is also provided.

In a preferred embodiment, the electrically heated aerosol generating system for receiving an aerosol-forming substrate includes: a heater for heating the aerosol-forming substrate. The heater includes a plurality of elongate heating elements arranged in an elongate array having a support end with a first dimension, a heating end with a second dimension and a middle portion with a third dimension. Preferably, the array is arranged to heat the substrate to form an aerosol. Also preferably, the third dimension is greater than the first dimension and greater than the second dimension.

Preferably, the electrically heated aerosol generating system is an electrically heated smoking system. In the preferred embodiment, a first voltage is connectable to at least one of the plurality of heating elements; and a second voltage is connectable to at least one other of the plurality of heating elements. Features described in relation to one embodiment may also be applicable to the other embodiments.

In the preferred embodiment, the aerosol-forming substrate includes a tubular substrate having a cavity for receiving the plurality of heating elements. Alternatively, the aerosol-forming substrate may include a substantially conical substrate having a cavity for receiving the plurality of heating elements. In other embodiments, the aerosol-forming substrate may have any other suitable shape which allows insertion of the heating elements. As used herein, the term "cavity" is used to mean a space within the aerosol-forming substrate into which the heater may be inserted.

The aerosol-forming substrate preferably includes a tobacco-containing material containing volatile tobacco flavor compounds which are released from the substrate upon heating. The aerosol-forming substrate may include a non-tobacco material. The aerosol-forming substrate may include tobacco-containing material and non-tobacco containing material. Preferably, the aerosol-forming substrate further includes an aerosol former. Examples of suitable aerosol formers are glycerine and propylene glycol.

The aerosol-forming substrate is preferably a solid substrate. The solid substrate may include, for example, one or more of: powder, granules, pellets, shreds, spaghettis, strips or sheets containing one or more of: herb leaf, tobacco leaf, fragments of tobacco ribs, reconstituted tobacco, extruded tobacco such as homogenised tobacco and expanded tobacco. The solid substrate may be in loose form, or may be provided in a suitable container or cartridge. Optionally, the solid substrate may contain additional tobacco or non-tobacco volatile flavor compounds, to be released upon heating of the substrate.

Optionally, the solid substrate may be provided on or embedded in a thermally stable carrier. In a preferred embodiment, the carrier is a tubular carrier having a thin layer of the solid substrate deposited on its inner surface, or on its outer surface, or on both its inner and outer surfaces. Such a tubular carrier may be formed of, for example, a paper, or paper like material, a non-woven carbon fiber mat, a low mass open mesh metallic screen, or a perforated metallic foil or any other thermally stable polymer matrix. Alternatively, the carrier may take the form of powder, granules, pellets, shreds, spaghettis, strips or sheets.

The solid substrate may be deposited on the surface of the carrier in the form of, for example, a sheet, foam, gel or slurry. The solid substrate may be deposited on the entire surface of the carrier, or alternatively, may be deposited in a pattern in order to provide a non-uniform flavor delivery during use.

Alternatively, the carrier may be a non-woven fabric or fiber bundle into which tobacco components have been incorporated. The non-woven fabric or fiber bundle may include, for example, carbon fibers, natural cellulose fibers, or cellulose derivative fibers.

Further, as known to those skilled in the art, an aerosol is a suspension of solid particles or liquid droplets in a gas, such as air. The aerosol may be a suspension of solid particles and liquid droplets in a gas, such as air. Air is a mixture of about 78% nitrogen and 21% oxygen by volume. Carbon dioxide and other trace gases make up the remaining 1%.

During operation, the substrate may be completely contained within the electrically heated aerosol generating system. In that case, a consumer may puff on a mouthpiece of the electrically heated aerosol generating system. Alternatively, during operation, the substrate may be partially contained within the electrically heated aerosol generating system. In that case, the substrate may form part of a separate article and the consumer may puff directly on the separate article. Preferably, the substrate forms part of a separate smoking article and the consumer may puff directly on the smoking article.

The smoking article may have a total length ranging from about 30 mm to about 100 mm. The smoking article may have an external diameter ranging from about 5 mm to about 13 mm. The smoking article may include a filter plug. The filter plug may be located at the downstream end of the smoking article. The filter plug may be a cellulose acetate filter plug. The filter plug is preferably about 7 mm in length, but can have a length ranging from about 5 mm to about 10 mm.

Preferably, the smoking article is a cigarette. In a preferred embodiment, the smoking article has a total length ranging from about 40 mm to about 50 mm. Preferably, the smoking article has a total length of about 45 mm. It is also preferable for the smoking article to have an external diameter of about 7.2 mm. Preferably, the aerosol-forming substrate includes tobacco. Further, the aerosol-forming substrate may have a length of about 10 mm. However it is most preferable for the aerosol-forming substrate to have a length of about 12 mm.

Further, the diameter of the aerosol-forming substrate may also range from about 5 mm to about 12 mm.

In the preferred embodiment, the smoking article may include an outer paper wrapper. Further, the smoking article may include a separation between aerosol-forming substrate and the filter plug. The separation may be about 18 mm, but can be in the range from about 5 mm to about 25 mm.

Preferably, the electrical energy is supplied to one or more of the heating elements until the heating element(s) reach a temperature ranging from about 200° C. to about 440° C. Any suitable temperature sensor and control circuitry may be used in order to control heating of the heating element to reach the temperature ranging from about 200° C. to about 440° C. This is in contrast to conventional cigarettes in which the combustion of tobacco and cigarette wrapper may reach 800° C.

The system may further include a sensor to detect air flow indicative of a consumer taking a puff. In that embodiment, preferably, the sensor is connected such that the system is arranged to energise at least one of the heating elements when the sensor senses a consumer taking a puff. The sensor may be an electro-mechanical device. Alternatively, the sensor may be any of: a mechanical device, an optical device, an opto-mechanical device and a micro electro mechanical systems (MEMS) based sensor. In that embodiment, preferably, the sensor is connected to a power supply and the system is arranged to activate the heating elements, or some of the heating elements, when the sensor senses a consumer taking a puff. In an alternative embodiment, the system further includes a manually operable switch, for a consumer to initiate a puff.

Preferably, the system further includes a housing for receiving the aerosol-forming substrate and designed to be grasped by a consumer. The housing preferably houses the heater, a voltage source and any other components required for the system.

Preferably, the electrically heated smoking system further includes a power supply for supplying power to the heating elements. The power supply for providing the first and second voltages may be any suitable power supply, for example a direct current (DC) voltage source. In one embodiment, the power supply is a lithium-ion (Li-ON) battery. Alternatively, the power supply may be a nickel-metal hydride battery or a nickel cadmium (NiCad) battery, or lithium iron phosphate, or lithium manganese battery. The power supply may include a power cell contained in the electrically heated smoking system. Alternatively, the power supply may include circuitry, for example including a capacitor, which is chargeable by an external charging portion and an interface for connection to an external power source.

Preferably, the electrically heated smoking system further includes electronic circuitry arranged to be connected to the power supply and the heating elements. In some embodiments, preferably the electronic circuitry provides for the heating elements to be independently controllable. The electronic circuitry may be programmable.

Features described in relation to one embodiment may also be applicable to another embodiment.

Figure 2:
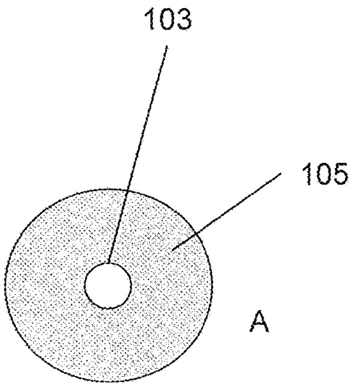
FIG. 2 shows a collar portion of the first embodiment of a heater, during construction.
Figure 3:
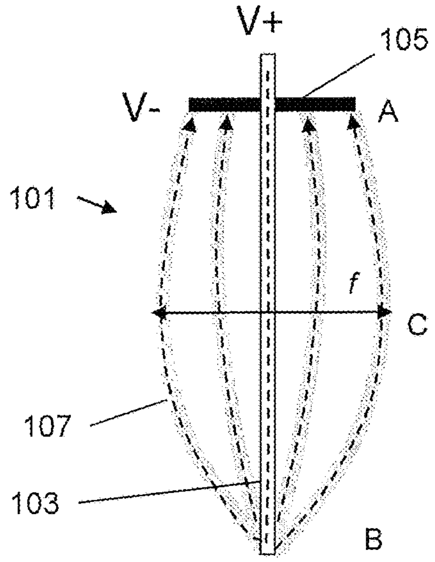
FIG. 3 shows the heater of FIGS. 1 and 2, in constructed form.

FIGS. 1 to 5, 7 and 8 show a first embodiment of the heater of the preferred embodiment. Referring particularly to FIGS. 1, 2 and 3, heater 101 includes an electrically conductive pin in the form of common pin 103, annular collar 105 and a plurality of heating elements 107. The assembled heater 101 has a collar end A, a heating end B and a middle portion C. FIG. 1 shows the heating elements 107 before final assembly, after being formed by flat stamping from a sheet of suitable material. FIG. 2 shows the collar portion including annular collar 105 and common pin 103, before final assembly. The annular collar 105 may be an electrically insulating material which acts as a support to hold the position of the heating elements in the shape shown in FIG. 3. The annular collar 105 may also hold the common pin 103 in a substantially central position on the collar. In embodiments which have common control of the heating elements (described below in relation to FIG. 4), the collar may be electrically conductive so that when the heating elements are joined to the collar, an electrical connection is made between the heating elements and collar.

Preferably, the common pin 103 is formed separately from the heating elements 107 and collar 105. After flat stamping, the heating elements 107 are bent inwards relative to heating end B. The common pin 103 is inserted in the central aperture of the annular collar 105 but there may be no direct electrical connection between the common pin 103 and the collar 105. At the collar end A, the heating elements 107 are connected to the outer portion of the annular collar 105. At the heating end B, the heating elements 107 are electrically and physically connected to the common pin 103. This assembly forms the substantially elongate array structure shown in FIG. 3.

Referring particularly to FIG. 3, which is a side view of the assembled heater, the heating elements 107 of the assembled heater form a substantially elongate array having a generally circular cross-section collar end A, a pointed heating end B and a generally circular cross-section middle portion C. The diameter of the middle portion C is marked f in FIG. 3. The heater may be referred to as an internal heater. The particular curved shape of the heating elements 107 will be discussed further below. As shown in FIG. 3, the common pin 103 is connected to a first voltage, shown as V+, and the collar 105 is connected to a second voltage, shown as V−. For clarity, only four of the eight heating elements 107 are shown in FIG. 3.

Preferably, when not in use, the diameter f of the heater in the middle portion C, that is to say about the distance between opposite heating elements in the middle portion ranges from about 5 mm to about 13 mm. When the heater is not compressed, the diameter f of the middle portion C may be larger than the diameter of the collar end A by about 0.5 mm or 1 mm. Preferably, the separation of the heating elements at the middle portion C, that is to say the distance between adjacent heating elements, when the heater is not compressed may be range from about 1 mm to about 4 mm. More preferably, the separation of the heating elements at the middle portion C, when the heater is not compressed, may range from about 1.25 mm to about 3.25 mm.

Figure 4:
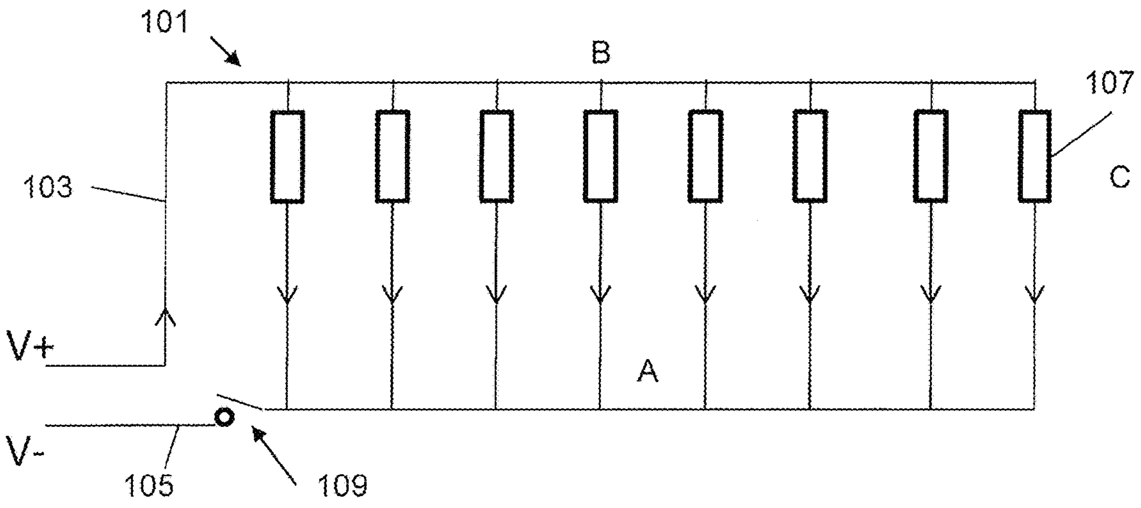
FIG. 4 is an electrical circuit diagram showing the electrical connections of the heater of FIG. 3 with common heating element control.

In the preferred embodiment, each of the heating elements at the collar end A are electrically connected to each other, and then to a single switch. This is shown in the circuit diagram in FIG. 4 and is referred to as common control. Referring to FIG. 4, the common pin 103 is connected to a first voltage V+. The heating elements 107 are connected to the first voltage and are connected in parallel to each provide a voltage drop to a lower voltage. The heating elements are connected to each other at the lower voltage and then to a single switch 109. The switch 109 is, in turn, electrically connected to a second voltage V− at collar 105. In this arrangement, a single switch 109 controls whether electrical current passes through all of the heating elements 107. The switch 109 shown in FIG. 4 is a mechanical switch, but may alternatively be a transistor, such as a field effect transistor (FET), a bipolar transistor, MOSFET or another type of switch.

During operation, when the switch 109 is closed, electrical current flows, as indicated by the dashed lines in FIG. 3 and the arrows in FIG. 4. All the heating elements 107 heat up by virtue of the Joule heating effect. Of course, the current flow may be in the opposite direction. In that case, the common pin 103 which runs through the center of the heater is connected to a voltage V−, and the collar ends of the heating elements are connected to a voltage V+. That is to say, it is sufficient for there to be a potential difference between the collar end of the common pin and the collar end of the heating elements for electrical current to flow. As already mentioned, this mode of operation, in which a single switch controls the current flow through all the heating elements 107 is referred to as common control.

Figure 5:
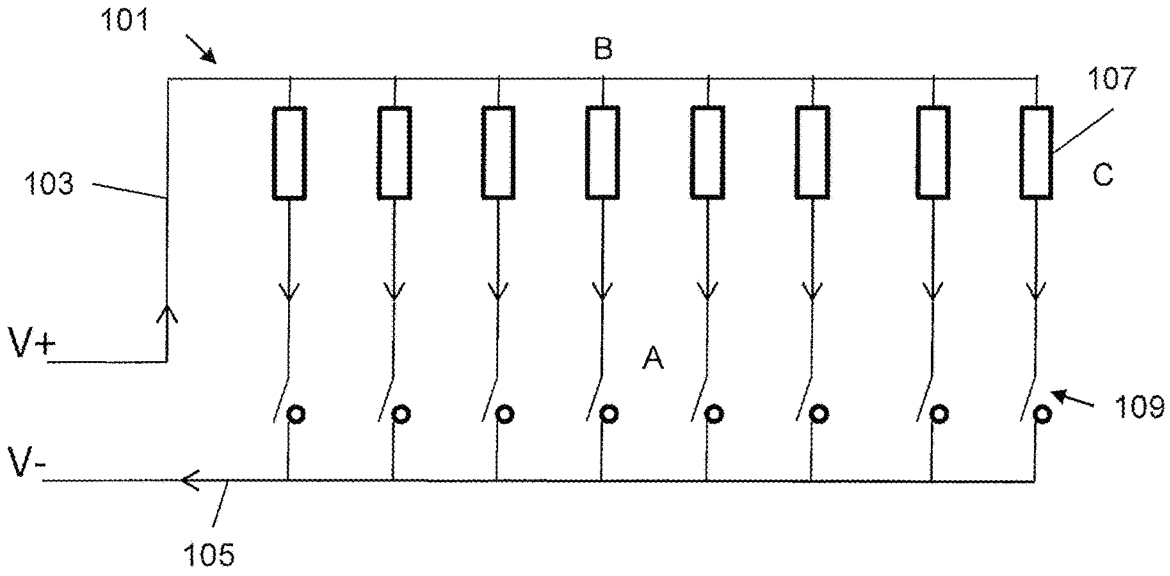
FIG. 5 is an electrical circuit diagram showing the electrical connections of the heater of FIG. 3 with individual heating element control.

In another embodiment, individual control of each of the heating elements 107 is possible. The circuit diagram for this embodiment is shown in FIG. 5 and is referred to as individual control. Referring to FIG. 5, the common pin 103 is connected to a first voltage V+, as in FIG. 4. The common pin 103 is electrically and mechanically connected to all of the heating elements at the heating end B of the heater. Thus, the heating elements 107 are connected to the first voltage. The heating elements 107 are connected in parallel to each provide a voltage drop to a lower voltage. At the lower voltage, each of the heating elements 107 is connected to a non-conducting collar portion by welding or gluing or otherwise attaching them in a separate stage in the manufacturing process. The non-conducting collar may be stamped of sheet insulating material as previously described. At the collar end A each heating element 107 is connected via switch 109 to the second voltage, shown as V− at collar 105. The switches 109 shown in FIG. 5 are mechanical switches, but may also be transistors, such as field effect transistors (FETs), bipolar transistors, MOSFET's or another type of switch.

During operation, when one or more of the switches 109 are closed, current passes through the respective resistive heating elements 107 as a result of the voltage drop between the common pin first voltage V+ and the second voltage V−. As shown by the arrows in FIG. 5, electrical current flows from V+ to V−. As the current flows, the temperature of the heating elements 107 whose corresponding switch has been closed increases, thereby heating the aerosol-forming substrate. Of course, as in FIG. 4, the current flow may be in the opposite direction. As discussed further below, the temperature of common pin 103 increases, but preferably significantly less than the temperature of the heating elements 107.

The heating elements 107 and are formed from an electrically resistive sheet material, for example nickel chromium, iron aluminide, a tungsten alloy or any other electrically resistive, high performance metal alloy. The common pin is typically formed from an electrically conducting material such as copper. The common pin does not substantially contribute to the heating of the substrate. It typically has a resistance of about 5% to about 10% of the overall resistance of the heating elements. Preferably, the common pin is of a size such that it does not become a heat sink and dissipate heat from the heating elements. The collar 105 may be formed from an electrically conducting material such as copper.

Alternatively, the collar may be formed from an electrically insulating material, such as plastics or ceramics. In this case, after the heating elements at the support end have been mechanically connected to the collar by gluing, welding or otherwise attaching them, an electrical connection is made between each of the heating elements at the support end and the switch, to control the flow of current in the heating elements.

The switches 109 in FIGS. 4 and 5 may be formed in a number of ways. Firstly, a wire can be soldered to one end, marked V−, of the electrically conductive collar as well as a soldering a second wire to the common pin marked V+ in FIG. 3. In this embodiment, the collar and the plurality of heating elements are electrically joined to one another.

A switch 109 may be provided on a separate printed circuit board away from the heating element. The switch is preferably a metal-oxide-semiconductor field-effect transistor (MOSFET), and the wires are electrically connected to a power supply via the switch.

Alternatively, after flat stamping of the heating element as previously described, a separate printed circuit board about in the shape of the collar 105 may be manufactured including the switches such as MOSFETs and the electrical circuitry of FIG. 4. Suitable electrical connections are then made between the collar mounted printed circuit board and the heating elements and common pin to form the electrical circuit of FIG. 4.

In FIGS. 1, 3, 4 and 5, eight heating elements 107 are shown. However, any suitable number of heating elements is possible. For example, there may be between 5 and 15 heating elements. More preferably, there may be 10, 11 or 12 heating elements. Also, external heating elements may be provided in addition to the heating elements 107. This will be described further in relation to FIGS. 8 and 13.

Figure 6:
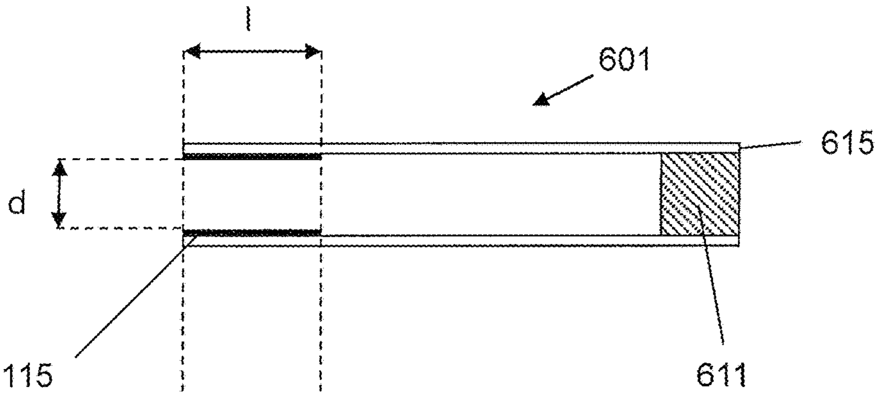
FIG. 6 shows a schematic section through a smoking article for use with embodiments of the invention, the smoking article including a tubular mat of aerosol-forming substrate.

FIG. 6 shows a smoking article 601 for use with the electrically heated smoking system. The smoking article 601 has a generally elongate cylindrical shape and includes an aerosol-forming substrate 115, and a filter plug 611, arranged sequentially and in coaxial alignment. The components 115 and 611 are overwrapped with an outer paper wrapper 615. The aerosol-forming substrate 115 is substantially tubular. The length l of the tube may be substantially parallel to the length of the smoking article. Further, the length l of the tube may be substantially parallel to the direction of airflow (not shown) in the electrically heated smoking system when a consumer puffs on the smoking article. The circumference of the tube may be substantially perpendicular to the length, and the inner diameter of the tube is d.

Figure 7:
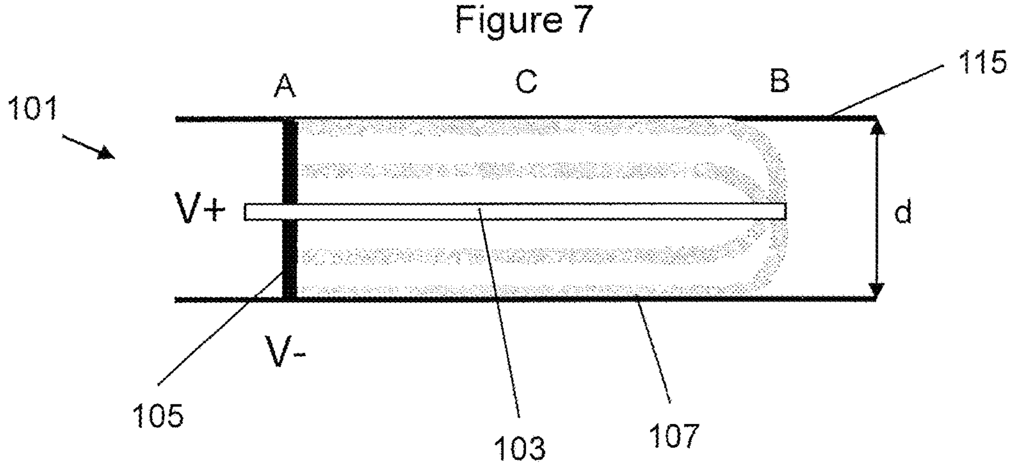
FIG. 7 shows the heater of FIG. 3 inserted into a tubular mat of tobacco.

FIG. 7 shows the heater of FIG. 3 inserted into a tubular mat of tobacco 115, like that in FIG. 6. In the heater of FIG. 3, the heating elements form a substantially bullet-shaped array which narrows to a tip at the heating end B. In FIG. 3, the diameter of the array at the middle portion C, marked f in FIG. 3, is greater than the diameter of the array at the tip (heating end B) and at the support end A.

Referring to FIG. 7, common pin 103, which runs through the center of the heater and is connected to the first voltage V+, provides a common connection for each of the heating elements 107. At heating end B, the common pin 103 is electrically and physically connected to each heating element 107. Each heating element is a resistor, which heats up when current passes through, thereby heating the substrate. FIG. 7 shows the heater inserted into the tubular mat when the internal diameter d of the tubular mat is smaller than the diameter f of the heater at middle portion C, shown in FIG. 3. U.S. Pat. No. 5,499,636 teaches a construction for a tobacco mat suitable for electronically heated cigarettes and is incorporated herein by this reference thereto. The act of inserting the heater in the mat causes the heating elements 107 to be forced inwards towards the common pin 103. In order to facilitate this movement, the heating elements are deformed as shown in FIG. 7. This movement of the heating elements is referred to as mechanical articulation. This brings more of the heating element into contact with the tubular mat than would be the case if the diameter of the heater f at middle portion C in FIG. 3 were the same as or smaller than the internal diameter of the tubular mat d, shown in FIGS. 6 and 7. In addition, it ensures good contact between the heating element and the tubular mat.

When the heating element is inserted in the tubular mat, the shape of the heating element changes from a substantially bullet shape, with a diameter at the middle portion C which is larger than the diameter at either of the two ends A, B, to a substantially tubular shape in which the sides of the heater are substantially parallel to the tubular mat. Further, when the heater is substantially tubular in shape, the diameter of the heater is substantially constant along the length of the heater. Further, the shape of the tip of the heater B is also transformed from a pointed shape, as shown in FIG. 3, to a more rounded shape, as shown in FIG. 7.

Figure 8:
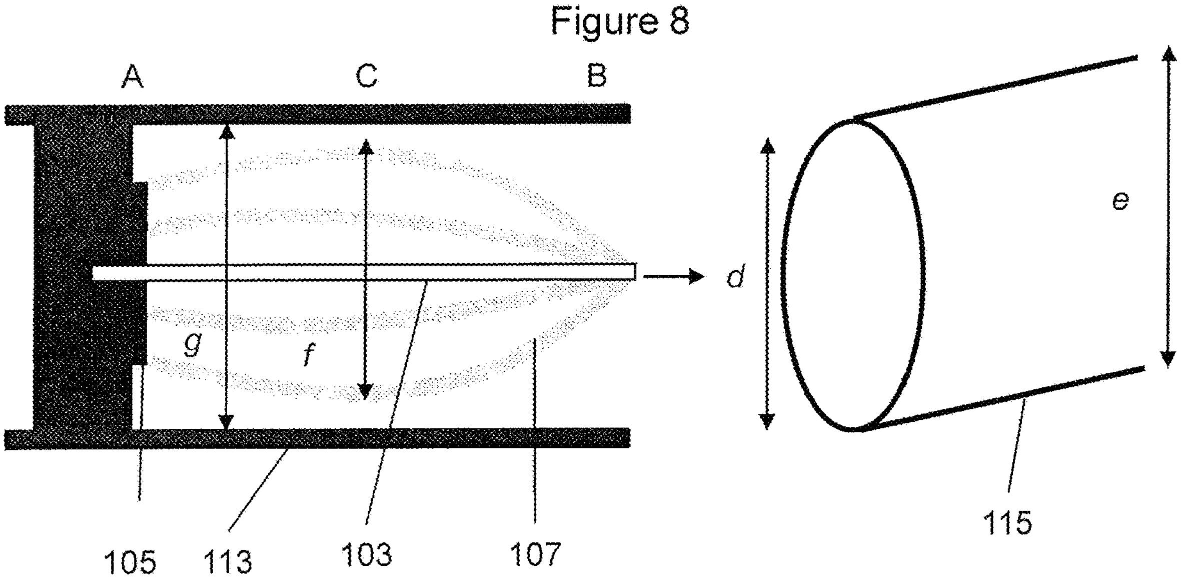
FIG. 8 shows a heater similar to that of FIG. 3 ready for use with a tubular mat of tobacco in a smoking article.

FIG. 8 shows a heater, similar to that of FIG. 3, ready for use with a tubular mat of tobacco in a smoking article. The heater is shown in cross section on the left hand side of FIG. 8. The heater includes the common pin 103, heating elements 107 and collar 105 as previously described, and additionally includes a substantially tubular frame 113. The tubular frame may include one or more external heating elements on its inner surface, although this is not shown in FIG. 8. The aerosol-forming substrate 115 is shown schematically on the right hand side of FIG. 8. Preferably, the aerosol-forming substrate is a substantially tubular mat of tobacco. The heater is inserted into the tubular mat at the heating end B, such that the array of heating elements 107 is positioned inside the tubular mat, and the frame 113 is positioned outside the tubular mat. The internal diameter d of the tubular mat is preferably comparable to or slightly smaller than the diameter f of the middle portion C of the elongate array. Thus, when the elongate array is inserted into the tubular mat, there may be an outward force exerted on the tubular mat by the curved heating elements. This ensures a tight fit so that the array stays in position and good contact between the heating elements and the substrate, as described in relation to FIG. 7. The external diameter e of the tubular mat is preferably comparable to or slightly smaller than the internal diameter g of the frame 113. This also ensures a tight fit. It also substantially maximizes heating efficiency if external heating elements are provided on the inner surface of frame 113.

Figure 9:
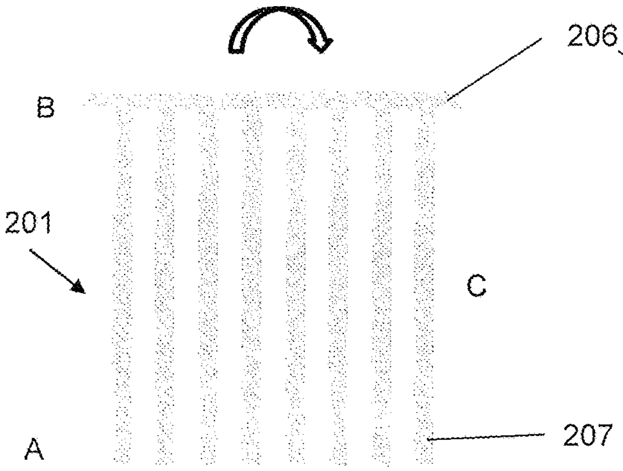
FIGS. 9 and 10 show alternative methods of construction of the heater of FIG. 3.
Figure 10:
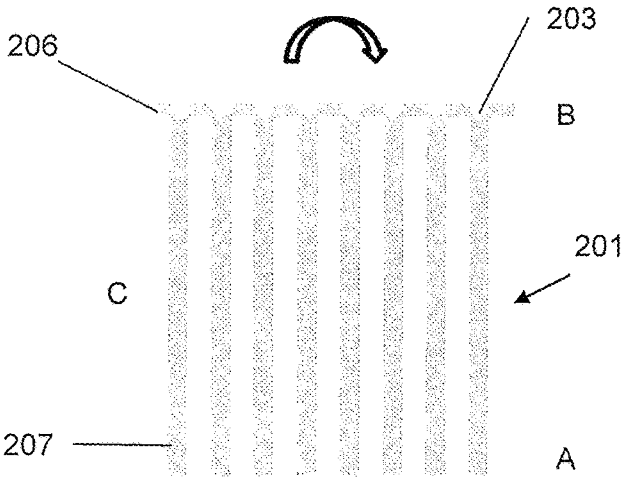

FIGS. 9 and 10 show alternative methods for constructing the heater of an embodiment of the invention. In both FIGS. 9 and 10, before final assembly, the heater 201 includes a linking element 206 and a plurality of heating elements 207.

In the embodiment shown in FIG. 9, the heating elements 207 are formed by flat stamping from a single sheet of suitable material using an appropriately shaped stamp. The heating elements are stamped out to form a number of substantially parallel legs. All of the legs are electrically and mechanically joined to each other by a substantially straight linking element 206. The linking piece may be substantially perpendicular to the legs.

In the embodiment shown in FIG. 10, the heating elements 207 are formed separately and each heating element 207 is then spot welded at weld 203 to the linking element 206.

In either FIG. 9 or FIG. 10, after forming, the linking element 206 is bent, as shown by the arrows in FIGS. 9 and 10, to form a ring. The ring has heating elements 207 extending at about a 90° angle from the linking element 206. The two ends of the linking element may be joined together by welding or gluing or using any other suitable joining method. When bent or shaped in this way, the linking element 206 is preferably substantially circular in shape. Then, the heating elements 207 are shaped into the shape shown in FIG. 3, and mechanically attached to a collar 105 (like that shown in FIG. 2) using welding, gluing or any other joining process.

Once again, the collar may be electrically insulating in the case of individual heating element control, but may be electrically conductive in the case of common control of the heating elements. The collar also serves as a mechanical support for the heating elements 207. In addition, slots may be formed in the collar portion by laser cutting or using a saw and the heating elements may be inserted into the slots and fixed into place using glue, welding, screwing or bending of the heating elements. The switches 109 (not shown in FIGS. 9 and 10) may be formed as previously described. In FIGS. 9 and 10, the collar end is marked A, the heating end is marked B and the middle portion is marked C. The common pin may be attached to the heater as previously described with reference to FIGS. 1 to 3.

Figure 11:
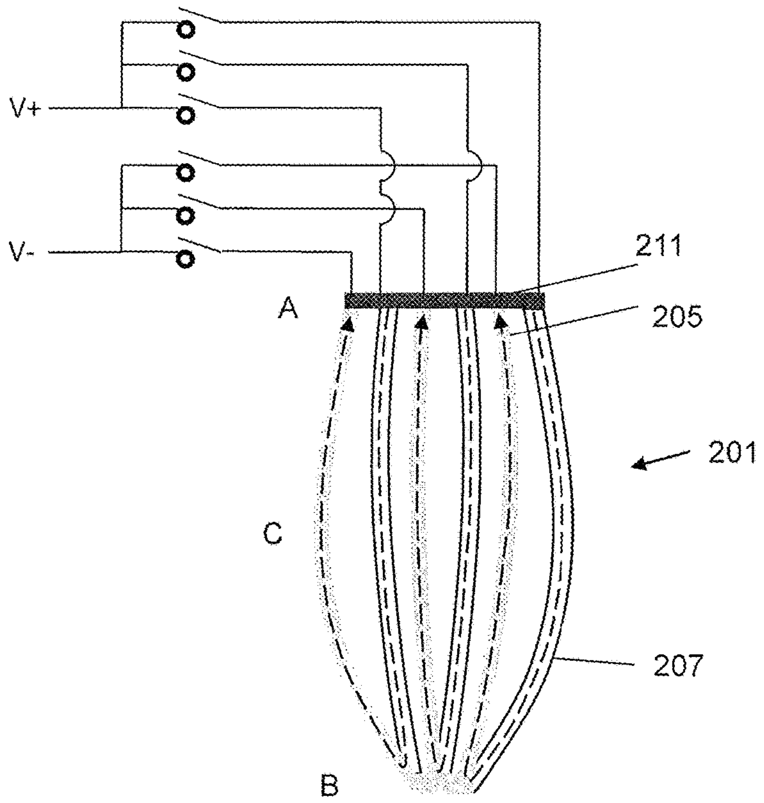
FIG. 11 shows a second embodiment of a heater according to the invention.
Figure 12:
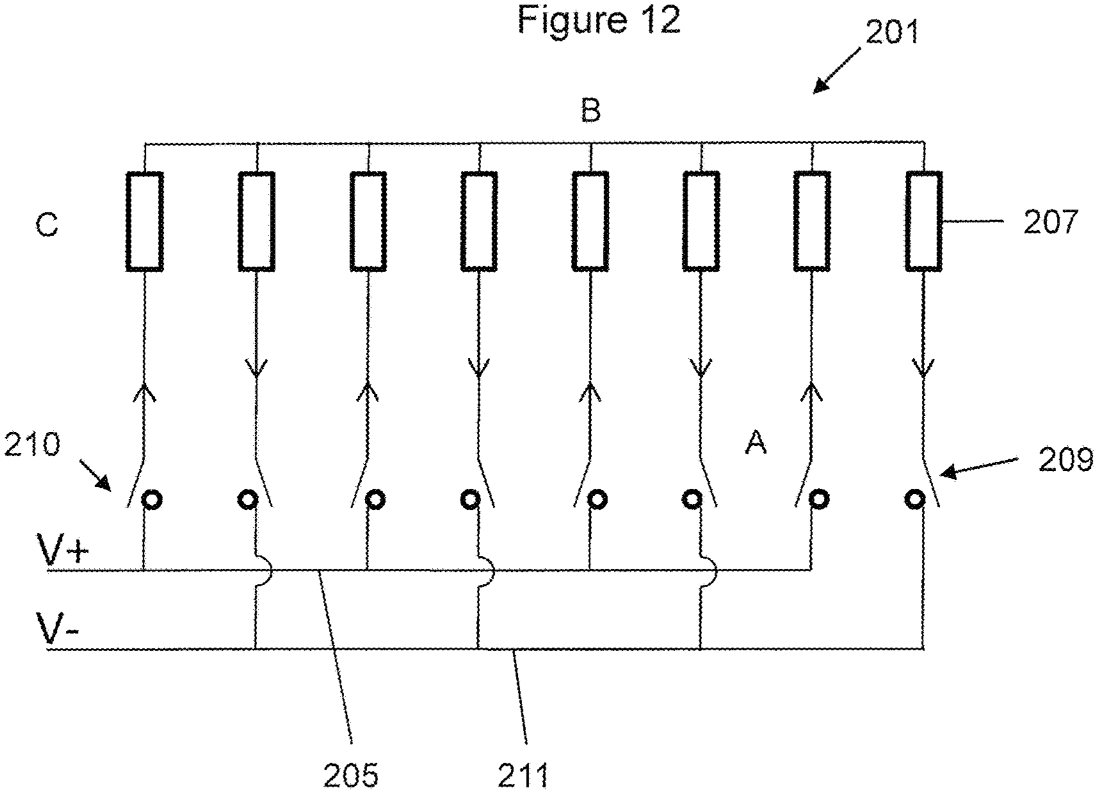
FIG. 12 is an electrical circuit diagram showing the electrical connections of the heater of FIG. 11.
Figure 13:
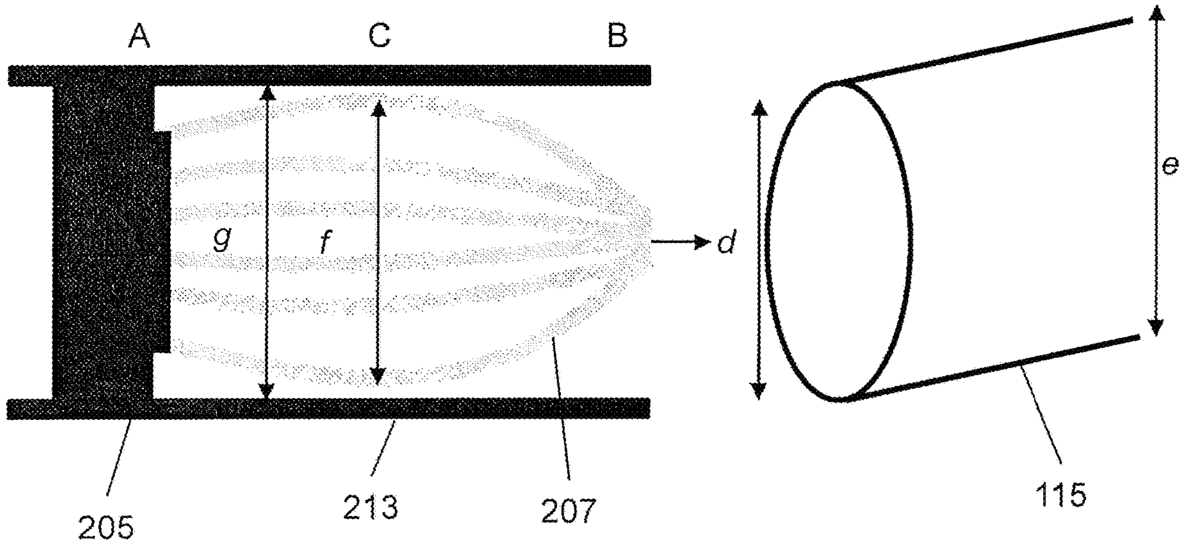
FIG. 13 shows a heater similar to that of FIG. 11 ready for use with a tubular mat of tobacco in a smoking article.

FIGS. 11, 12 and 13 show a second embodiment of the heater. FIG. 11 shows a side view of the assembled heater and includes an electrical circuit diagram showing the electrical connections of the heater. FIG. 12 is an electrical circuit diagram showing the electrical connections of the heater of FIG. 11. FIG. 13 shows a heater similar to that shown in FIG. 11 ready for use with a tubular mat of tobacco in a smoking article. Unlike the embodiment of FIGS. 1 to 5, 7 and 8, there is no common pin; instead, an electrical multipath system is used. The heater of FIG. 11 may be made using the method shown in FIGS. 1 and 2 or FIG. 9 or FIG. 10.

FIG. 11 shows a side view of the assembled heater. For clarity, in FIG. 11, only six of the heating elements 207 are shown. The heating elements 207 of the assembled heater form a substantially elongate array having a generally circular cross-section collar end A, a pointed heating end B and a generally circular cross-section middle portion C. The particular curved shape of the heating elements 207 will be discussed further below. As shown in FIGS. 11 and 12, some of the individual heating elements are connected at collar end A to a first voltage, shown as V+, and some are connected at collar end A to a second voltage, shown as V−. All the heating elements are electrically and mechanically connected to each other at the heating end B of the heater. Electrical circuitry, wires and switches are provided as previously described to form the circuitry shown in FIGS. 11 and 12. The dashed lines in FIG. 11 show how the electrical current flows in the heating elements 207 when the appropriate switches are closed.

Referring to FIG. 12, as previously described, some of the heating elements at the collar end A are connected to the first voltage V+ via switches 210, a switch 210 being provided for each heating element. A connection 205 to the first voltage V+ is provided within the circuitry of the heater. Others of the heating elements at the collar end A are connected to the second voltage V− via switches 209, a switch 209 being provided for each heating element. A connection 211 to the second voltage V− is provided within the circuitry of the heater. Each heating element 207 is a resistor which heats up when current passes through, thereby heating the substrate.

In FIG. 12, four heating elements are shown connectable to the first voltage and four heating elements are shown connectable to the second voltage. However, any allocation between the two voltages is possible, as long as least one heating element can be connected to the first voltage and at least one heating element can be connected to the second voltage. In FIG. 11, the arrows show the direction of flow of the electrical current when the appropriate switches are closed. The switches 209, 210 in FIG. 12 are shown as mechanical switches, but could easily be transistors, such as field effect transistors, FET, bipolar transistors, or another type of switch.

In the embodiment of FIGS. 11 and 12, the switches 209, 210 are preferably each controlled individually. This allows each heating element to be selectively energized. This provides a way to heat different portions of the aerosol-generating substrate. Further, this allows for different portions of the substrate to be heated sequentially. However, all switches 209 could be replaced by a single switch if desired. All switches 210 could be replaced by a single switch if desired.

In operation, when at least one switch 209 is closed and at least one switch 210 is closed, a connection is formed between the first and second voltages and current passes through the respective heating elements 207. The temperature of the heating elements 207 increases, thereby heating the aerosol-forming substrate. The particular heating elements to be energized are selected by switching the appropriate switches 209, 210. When no switches are connected, no voltage drop is provided, so that none of the heating elements 207 are energized.

The heating elements 207 are formed from one or more electrically resistive sheets of material, for example nickel chromium, iron aluminide, a tungsten alloy or any other electrically resistive, high performance metal alloy as already described. The collar may be formed from a separate electrically non-conductive material, as previously described.

In the embodiments shown in FIGS. 7, 8, 9, 10, 11 and 12 eight heating elements 207 are shown. However, any suitable number of heating elements is possible. For example, there may be between 5 and 15 heating elements. More preferably, there may be 10, 11 or 12 heating elements. Also, external heating elements may be provided in addition to the heating elements 207.

FIG. 13 shows a heater, similar to that of FIG. 11, ready for use with a tubular mat of tobacco in a smoking article. For clarity, only six heating elements are shown. The heater is shown in cross section on the left hand side of FIG. 13. The heater includes heating elements 207 and collar 205 as previously described, and additionally includes a substantially tubular frame 213. The tubular frame may include one or more external heating elements on its inner surface, although this is not shown in FIG. 13. The aerosol-forming substrate 115 is shown schematically on the right hand side of FIG. 13. Preferably, the aerosol-forming substrate is a substantially tubular mat of tobacco. The heater is inserted into the tubular mat at the heating end B, such that the array of heating elements 207 is positioned inside the tubular mat, and the frame 213 is positioned outside the tubular mat.

The internal diameter d of the tubular mat is preferably comparable to or slightly smaller than the diameter f of the middle portion C of the elongate array. Thus, when the elongate array is inserted into the tubular mat, there may be an outward force exerted on the tubular mat by the curved heating elements. This ensures a tight fit so that the array stays in position and good contact between the heating elements and the substrate, as previously described. As previously described, this is known as mechanical articulation. The external diameter e of the tubular mat is preferably comparable to or slightly smaller than the internal diameter g of the frame 213. This also ensures a tight fit. It also maximizes heating efficiency if external heating elements are provided on the inner surface of frame 213.

Note that many of the features of the embodiments described above are interchangeable.

In operation, the heating elements of the heaters typically reach a temperature of less than about 500° C. More preferably, the temperature reached ranges from about 300° C. to about 500° C. Even more preferably, the temperature reached is about 250° C.

The heaters shown in the drawings may be internal heaters. As used herein, the term “internal heater” refers to a heater in which the heating elements are arranged to be internal to or within the aerosol-forming substrate during use. In this way, any condensate that does form on the heating elements evaporates in the heating process, or is removed by contact with the substrate. In particular, this differs from an external heating element, in which the outer surface of each heating element may easily become dirty since it is never in contact with the substrate to remove any condensate. In the embodiments described which include a common pin 103, some self-heating of the common pin 103 is acceptable because the heat will prevent condensate from forming on the surface of the common pin and even on the inside surfaces of the heating elements.

Alternatively, the heater may be an external heater. As used herein, the term “external heater” refers to a heater which at least partially surrounds the aerosol-forming substrate.

In addition, because the heater may be an internal heater, the heating process can be more efficient. Thus, less power may be required and the time between a consumer’s puff and the aerosol being generated can be minimized. This is because the heating elements are internal to the aerosol-forming substrate during operation, so that most of the heat is used to heat the substrate and only a small amount of the heat is dissipated. In addition, unlike external heating elements, there is contact only with the substrate itself rather than, for example, an outer paper sleeve. This increases efficiency and also reduces the likelihood that undesirable flavors are released.

The heaters shown in the drawings are optimized when used with an aerosol-forming substrate having a substantially conical or tubular shape. For example, the substrate may include a conical or tubular shaped mat of tobacco material which defines a cavity for receiving the heating elements. Preferably, the heater and substrate are sized such that the heating elements need to be pressed inwards slightly in order to be inserted into the tubular or conical substrate. This results in an outward force being exerted by the heating elements on the inside wall of the substrate, which ensures good contact with the substrate. This may also assist in keeping the heating elements in place in the substrate. The tubular substrate may be formed in a rod of smoking material, such as in a cigarette.

In FIGS. 3, 7, 8, 11, and 13, the heating elements are shown with a generally elliptical shape, that is to say, bowed outward along their length. The heater has a first dimension at the support or collar end (marked A), a second dimension at the heating end (marked B) and a third dimension at the middle portion (marked C). (Because the heater in the drawings has a substantially circular cross-section, those dimensions are diameters.) This means that the largest diameter of the assembled heater is at the middle portion, around the center of the heating elements. This ensures a good contact with the substrate. Also preferably, the diameter at heating end B is smaller than the diameter at support end A, which facilitates insertion of the assembled heater into a tubular substrate. Preferably, the heating elements have a stiffness that allows them to be inserted into the substrate and a flexibility that allows them to fill the cavity formed by the substrate and maintain contact with the substrate.

In this specification, the word "about" is often used in connection with numerical values to indicate that mathematical precision of such values is not intended. Accordingly, it is intended that where "about" is used with a numerical value, a tolerance of ±10% is contemplated for that numerical value.

In this specification the words "generally" and "substantially" are sometimes used with respect to terms. When used with geometric terms, the words "generally" and "substantially" are intended to encompass not only features which meet the strict definitions but also features which fairly approximate the strict definitions.

While the foregoing describes in detail a preferred shaped heater for an aerosol generating system with reference to a specific embodiment thereof, it will be apparent to one skilled in the art that various changes and modifications may be made to the shaped heater and equivalents method may be employed, which do not materially depart from the spirit and scope of the invention. Accordingly, all such changes, modifications, and equivalents that fall within the spirit and scope of the invention as defined by the appended claims are intended to be encompassed thereby.

We claim:

1. A method, comprising:

forming an elongated array by first connecting first distal ends of first heating elements to each other to form a first end of the elongated array, and second connecting second distal ends of the first heating elements to each other to form a second end of the elongated array, a midsection of the first heating elements of the elongated array bowing concentrically outward from a radial centerline running longitudinally through the first end and the second end.

2. The method of claim 1, wherein the forming forms such that the first heating elements are configured to flex concentrically inward when a hoop force is applied to sides of the elongated array.

3. The method of claim 1, wherein the first connecting connects the first distal ends using a collar, the collar electrically connecting the first distal ends to each other.

4. The method of claim 1, wherein the second connecting connects the second distal ends using a linking element, the linking element mechanically and electrically connecting the second distal ends to each other.

5. The method of claim 4, wherein the second connecting connects the second distal ends such that the first heating elements are equally spaced apart from each other along the linking element.

6. The method of claim 1, wherein the second connecting connects the second distal ends using a pin, the pin extending between the first end and the second end, the first heating elements being electrically and mechanically connected to each other on the second end via the pin.

7. The method of claim 6, wherein the second connecting connects the second distal ends such that the pin is positioned along the radial centerline.

8. The method of claim 6, wherein the second connecting connects the second distal ends such that the second distal ends are electrically connected to each other in parallel via the pin.

9. The method of claim 6, wherein the second connecting connects such that the pin, which is made from a first material, experiences a lower temperature than the first heating elements, which are made from a second material, when an electric current flows through the pin and the first heating elements.

10. The method of claim 6, wherein the second connecting connects such that the pin, which is made from a first material, experiences a first electrical resistance that is between 5% and 10% that of a second electrical resistance of the first heating elements, which are made from a second material, when an electric current flows through the pin and the first heating elements.

11. The method of claim 6, wherein the first connecting connects the first distal ends using a collar, the collar electrically connecting the first ends to each other.

12. The method of claim 11, further comprising:

electrically connecting a first voltage source to the pin; and electrically connecting a second voltage source to the collar.

13. The method of claim 1, wherein the first connecting and the second connecting connects the first distal ends and the second distal ends such that the second end of the elongated array is configured to be inserted into a cavity of a substrate to heat and at least partially vaporize the substrate.

14. The method of claim 1, further comprising:

selectively inserting the second end of the elongated array at least partially into a tubular frame.

15. The method of claim 14, further comprising:

accepting a cylindrically-shaped substrate into the tubular frame, wherein the selectively inserting inserts such that the second end is inserted into a tubular cavity of the cylindrically-shaped substrate, the elongated array being configured to heat and at least partially vaporize the cylindrically-shaped substrate.

16. The method of claim 15, further comprising:

affixing second heating elements on an interior of the tubular frame, the second heating elements being configured to further heat and at least partially vaporize the cylindrically-shaped substrate.

17. The method of claim 1, further comprising:

selectively inserting the second end of the elongated array at least partially into a tubular cavity defined by a substrate to heat and at least partially vaporize the substrate with the first heating elements.

18. The method of claim 17, further comprising:

accepting the substrate into an interior of a tubular frame.

19. The method of claim 18, further comprising:

affixing second heating elements on the interior of the tubular frame, the second heating elements being configured to further heat and at least partially vaporize the substrate.

20. The method of claim 17, wherein the first connecting and the second connecting connects the first distal ends and the second distal ends such that at least a portion of the first heating elements are configured to maintain contact with an interior surface of the tubular cavity as the interior surface applies a hoop force to sides of the elongated array, when the second end of the elongated array is at least partially inserted into the tubular cavity.

* * * * *